United States Patent
Zhang

(10) Patent No.: US 10,107,925 B2
(45) Date of Patent: Oct. 23, 2018

(54) SMART TERMINAL

(71) Applicant: BOE TECHNOLOGY GROUP CO., LTD., Beijing (CN)

(72) Inventor: Bo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/544,904

(22) PCT Filed: Feb. 6, 2017

(86) PCT No.: PCT/CN2017/072952
§ 371 (c)(1),
(2) Date: Jul. 20, 2017

(87) PCT Pub. No.: WO2017/193652
PCT Pub. Date: Nov. 16, 2017

(65) Prior Publication Data
US 2018/0217280 A1    Aug. 2, 2018

(30) Foreign Application Priority Data
May 10, 2016  (CN) .......................... 2016 1 0305126

(51) Int. Cl.
| G08B 17/12 | (2006.01) |
| G01T 7/12 | (2006.01) |
| G08B 21/18 | (2006.01) |

(52) U.S. Cl.
CPC .............. *G01T 7/12* (2013.01); *G08B 21/182* (2013.01)

(58) Field of Classification Search
CPC . G01T 7/12; G01T 1/026; G06M 7/00; G06F 19/3418; G08B 21/12; G08B 21/16; G08C 2201/93
(Continued)

(56) References Cited

U.S. PATENT DOCUMENTS

2005/0253703 A1* 11/2005 He ........................... G01S 5/02
340/539.13
2007/0241261 A1* 10/2007 Wendt .................... G01D 9/005
250/221
2018/0113223 A1*  4/2018 Belobraydich ......... G01T 1/208

FOREIGN PATENT DOCUMENTS

| CN | 104079655 A | 10/2014 |
| CN | 104459346 A | 3/2015 |

(Continued)

OTHER PUBLICATIONS

First Office Action for Chinese Patent Application No. 201610305126.9 dated Dec. 25, 2017.

(Continued)

*Primary Examiner* — Toan N Pham
(74) *Attorney, Agent, or Firm* — Calfee, Halter & Griswold LLP

(57) ABSTRACT

The present disclosure provides a smart terminal, including a radioactive detector, a communication device, an interactive device and a processor. The radioactivity detector is configured to detect a radioactive parameter and send a detection value of the radioactive parameter to the processor. The interactive device is configured to receive an operation instruction of a user and send the operation instruction to the processor. The communication device is configured to establish a connection and pair with a mobile terminal having a wireless communication function through a short range wireless communication mode. The processor is configured to establish a mapping between the interactive device of the smart terminal and an interactive device of the mobile terminal, and remotely control the interactive device of the mobile terminal according to the operation instruction received by the interactive device of the smart terminal.

15 Claims, 1 Drawing Sheet

(58) Field of Classification Search
USPC ....... 340/600, 539.26, 539.22; 250/221, 372, 250/526
See application file for complete search history.

(56) References Cited

FOREIGN PATENT DOCUMENTS

| | | |
|---|---|---|
| CN | 104655268 A | 5/2015 |
| CN | 104656118 A | 5/2015 |
| CN | 104849330 A | 8/2015 |
| CN | 105137771 A | 12/2015 |
| CN | 204948175 U | 1/2016 |
| CN | 105301623 A | 2/2016 |
| CN | 106027124 A | 10/2016 |

OTHER PUBLICATIONS

Search Report for International Application No. PCT/CN2017/072952 dated May 3, 2017.

\* cited by examiner

SMART TERMINAL

CROSS REFERENCE

This application is based upon International Application No. PCT/CN2017/072952, filed on Feb. 6, 2017, which claims priority to Chinese Patent Application No. 201610305126.9, filed on May 10, 2016, the entirety contents thereof are incorporated herein by reference.

TECHNICAL FIELD

The present disclosure relates to a field of Internet of Things (IoT) technology, and more particularly, to a smart terminal having radioactive detection and wireless communication functions.

BACKGROUND

Radioactivity refers to the phenomenon that element spontaneously emanates rays (such as αrays, β rays, γ rays, etc.) from unstable nuclei until it is decayed to form a stable element (decay product). Under the radiation of large doses of rays, the human body and animal will suffer damage to some degree. Radioactivity may damage genetic material, which mainly may lead to genetic mutations and chromosomal aberrations. The effect of radioactive material on the human body is closely related to the dose of radiation. For example, a death rate of the irradiated person is 5% under the irradiation of 400 rad. A death rate of the irradiated person is 100% under the irradiation of 650 rad. A death rate is 0 under the irradiation of less than 150 rad, but the radioactivity under such a dose still injures the human body, while the impact on the human body will not show up until a long time period (for example, 20 years) has passed.

It should be noted that, information disclosed in the above background portion is provided only for better understanding of the background of the present disclosure, and thus it may contain information that does not form the prior art known by those ordinary skilled in the art.

SUMMARY

The present disclosure provides a smart terminal.

The present disclosure provides a smart terminal, including a radioactive detector, a communication device, an interactive device and a processor, wherein the radioactivity detector is configured to detect a radioactive parameter and send a detection value of the radioactive parameter to the processor;

the interactive device is configured to receive an operation instruction of a user and send the operation instruction to the processor;

the communication device is configured to establish a connection and pair with a mobile terminal having a wireless communication function through a short range wireless communication mode; and the processor is configured to establish a mapping between the interactive device of the smart terminal and an interactive device of the mobile terminal, and remotely control the interactive device of the mobile terminal according to the operation instruction received by the interactive device of the smart terminal.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

DETAILED DESCRIPTION

The technical solutions of the present disclosure will be described clearly and completely below with reference to the accompanying drawings of the present disclosure. Apparently, the described embodiments are a part of embodiments of the present disclosure, rather than all embodiments. All other embodiments obtained based on the embodiments of the present disclosure by those skilled in the art without creative labor are within the protection scope of the present disclosure.

The technical solutions of the present disclosure will be described in detail with reference to FIGS. 1 and 2.

The embodiments of the present disclosure provide a portable smart terminal, which is capable of detecting radioactive parameters in a radioactive environment and remotely controlling a mobile terminal of a user based on the Internet of Things (IoT), to achieve a normal wireless communication function of the mobile terminal.

Figure 1:
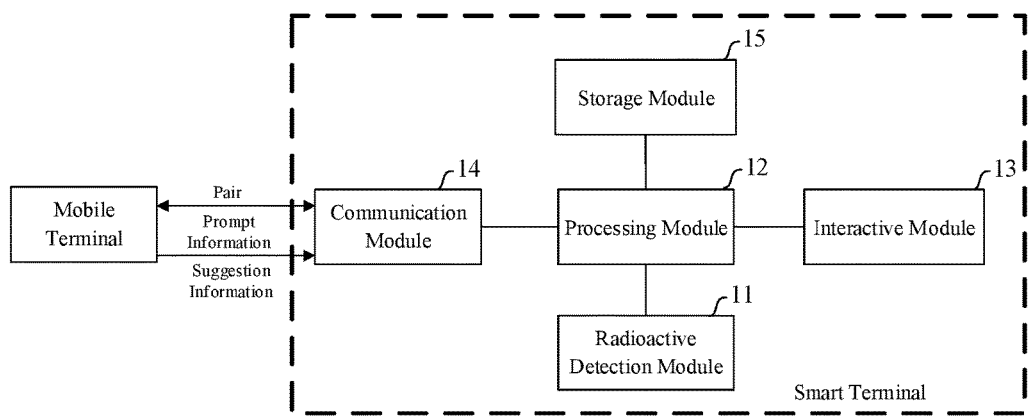
FIG. 1 is a module structural schematic diagram of a smart terminal according to an embodiment of the present disclosure.
Figure 2:
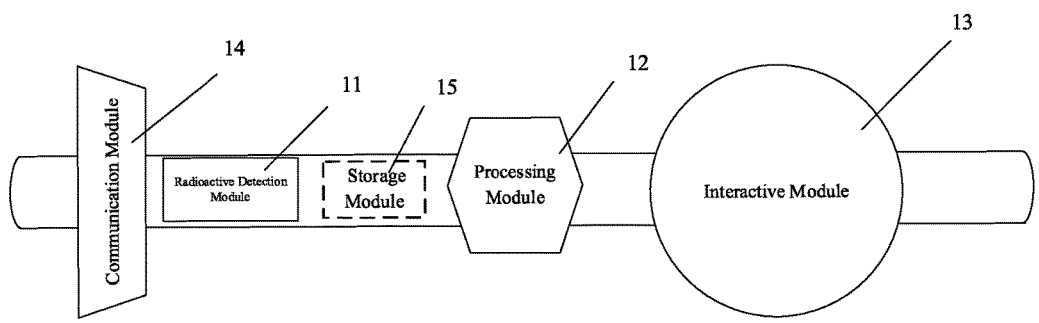
FIG. 2 is a structural schematic view of a smart terminal being a tie clip according to an embodiment of the present disclosure.

As shown in FIGS. 1 and 2, the smart terminal includes a radioactive detection module (e.g., a radioactive detector) 11, a processing module 12 and an interactive module (e.g., a interactive device) 13. Both the radioactive detection module 11 and the interaction module 13 are connected to the processing module (e.g., a processor) 12. The radioactivity detection module 11 is configured to detect a radioactive parameter and send a detection value of the radioactive parameter to the processing module 12. Particularly, an acquisition period T1 is preset in the radioactive detection module 11, and the radioactive detection module 11 periodically acquires the radioactive parameters according to the acquisition period T1. The acquisition period T1 may be set according to application scenes of the smart terminal. For example, in scenes such as laboratories and factories or the like, the acquisition period T1 may be set as 1-2 hours. In scenes such as radiology departments of hospitals or the like, the acquisition period T1 may be set as 10 minutes. The interactive module 13 is configured to receive an operation instruction of a user and send the operation instruction to the processing module 12.

The smart terminal further includes a communication module (e.g., a communication device) 14 connected to the processing module 12. The communication module 14 is configured to establish a connection and pair with a mobile terminal having a wireless communication function through a short range wireless communication mode. The mobile terminal may be located in an environment where wireless communication is allowed. The processing module 12 is configured to establish a mapping between the interactive module 13 of the smart terminal and an interactive module of the mobile terminal, and remotely control the interactive module of the mobile terminal according to the operation instruction received by the interactive module 13 of the smart terminal.

Particularly, after the communication module 14 of the smart terminal establishes a connection and pairs with the mobile terminal through a short range wireless communication mode, the processing module 12 virtualizes an operating system of the mobile terminal locally. The mobile terminal sends system state data to the smart terminal in real time, and the smart terminal restores the operation to the mobile terminal on the local virtual operating system according to the system state data. When the user operates the interactive module 13 of the smart terminal, the smart terminal may be awakened and the smart terminal is enabled to be connected and paired with the mobile terminal. The communication module 14 sends the operation instruction received by the interactive module 13 to the interactive module of the mobile terminal. According to the operation instruction, the mobile terminal operates the operating system of the mobile terminal through Hook (bottom hook) and other technologies, thus achieving the remote control of the mobile terminal by the smart terminal. In this way, the user may call the operation system of the mobile terminal through operating on the smart terminal side, perform dialing, and reading information and other operations, which corresponds to directly operating the mobile terminal, thereby realizing the wireless communication function of the mobile terminal.

According to the smart terminal of embodiments of the present disclosure, a communication module is utilized to perform short range wireless communication with a mobile terminal having a wireless communication function, so as to realize the connection and pairing between the smart terminal and the mobile terminal. A mapping is established between an interactive module of the smart terminal and an interactive module of the mobile terminal, such that the interactive module of the mobile terminal may be remotely operated by operating the interactive module of the smart terminal. In this way, when the smart terminal is in a closed radioactive working environment, on one hand, the radioactive detection and monitoring may be achieved by using the radioactive detection module, on the other hand, the wireless communication function of the mobile terminal may be achieved by remotely controlling the matched mobile terminal. Therefore, the radioactivity detection function and the wireless communication function may be effectively integrated, which achieves the normal use of the wireless communication function of the mobile terminal under the closed radioactive working environment, and improves the convenience of communication under the radioactive working environment.

Particularly, the short range wireless communication mode may include infrared, Bluetooth, WIFI (Wireless Fidelity), UWB (Ultra Wideband) or Zigbee.

Since a coverage area of WIFI may usually reach to about 90 meters, compared with other short range wireless communication modes, it has a wide range of radio coverage and will not be blocked by walls and other interferents. Therefore, optionally, the WIFI mode is chosen to achieve the communication between the smart terminal and the mobile terminal.

The processing module 12 is further configured to judge whether the detection value of the radioactive parameter satisfies a preset forewarning condition or a preset warning condition. When the forewarning condition is satisfied, the processing module 12 instructs the interactive module 13 to issue a forewarning. When the warning condition is satisfied, the processing module 12 indicates the interactive module 13 to issue a warning.

A processing period T2 may be preset in the processing module 12. The processing module 12 periodically judges whether the detection value of the radioactive parameter satisfies the preset forewarning condition or the preset warning condition according to the processing period T2. The processing period T2 of the processing module 12 is greater than the acquisition period T1 of the radioactive detection module 11. That is, the radioactive detection module 11 acquires a plurality of radioactive parameters during one processing period T2. A value of the acquisition period T2 may be set according to the application scenes of the smart terminal.

In addition, the processing module 12 may be preset with a first threshold value M1, a second threshold value M2, a third threshold value M3 and a fourth threshold value M4 configured to judge whether the detection value of the radioactive parameter satisfies the preset forewarning condition or the preset warning condition. The processing module 12 judges whether the forewarning condition is satisfied, according to a detection value m1 of the radioactive parameter detected at a latest time, the first threshold value M1 and the second threshold value M2, and/or, according to a sum m2 of respective detection values of the radioactive parameters within a previous processing period T2, the third threshold M3 and the fourth threshold M4. In addition, the processing module 12 judges whether the warning condition is satisfied, according to a detection value m1 of the radioactive parameter detected at a latest time and the first threshold value M1, and/or, according to a sum m2 of respective detection values of the radioactive parameters within a previous processing period T2 and the third threshold M3. In the embodiment, M3>M4>M1>M2.

The smart terminal may further include a storage module (e.g., a memory) 15, which is connected to the processing module 12 and configured to store respective detection values of the radioactive parameters within each processing period T2. Particularly, the processing module 12 is configured to compare the detection value m1 of the radioactive parameter detected by the radioactive detection module 11 at a latest time with the first threshold value M1 and the second threshold value M2, respectively, and obtain respective detection values of the radioactive parameters within the previous processing period T2 from the storage module 15, calculate a sum m2 of respective detection values of the radioactive parameters within the previous processing period T2, and compare m2 with the third threshold M3 and the fourth threshold M4, respectively.

The preset forewarning condition includes: m1 being less than M1 and greater than M2, and/or, m2 being less than M3 and greater than M4. Thus, when it is determined that m1 is less than M1 and greater than M2, and/or, m2 is less than M3 and greater than M4, the processing module 12 instructs the interaction module 13 to issue a forewarning.

That is, the processing module 12 may judge whether to instruct the interaction module 13 to issue a forewarning, based on the detection value m1 of the radioactive parameter detected at a latest time and the corresponding threshold values (M1 and M2) alone, alternatively, the processing module 12 may judge whether to instruct the interaction module 13 to issue a forewarning, based on a sum m2 of respective detection values of the radioactive parameters within the previous processing period T2 and the corresponding threshold values (M3 and M4) alone. Also, the processing module 12 may judge whether to instruct the interaction module 13 to issue a forewarning, by comparing the detection value m1 of the radioactive parameter detected at a latest time and the corresponding threshold values (M1 and M2) and comparing the sum m2 of respective detection values of the radioactive parameters within the previous processing period T2 and the corresponding threshold values (M3 and M4) simultaneously. Apparently, those skilled in the art will understand that the scheme of judging whether to issue a forewarning by combining m1 and m2 is more accurate, which may exclude accidental factors such as device failures and detection errors.

Further, when the detection value of the radioactivity parameter exceeds a corresponding threshold value, in order to intuitively present a degree of exceeding standard of the radioactivity parameter detection value to the user, to draw sufficient attention from the user and achieve a better warning effect, the smart terminal according to the embodiment of the present disclosure may also set different forewarning levels according to the degree of exceeding standard of the radioactivity parameter detection value, and display different forewarning levels using different colors on the interactive module 13.

Particularly, the processing module 12 calculates a first forewarning index p1 and/or a second forewarning index p2 according to the following formula: p1=(M1−m1)/M1 and p2=(M3−m2)/M3, when it is determined that m1 is less than M1 and greater than M2, and/or, m2 is less than M3 and greater than M4 (i.e., the forewarning condition is satisfied), and instructs the interactive module 13 to issue a forewarning by displaying different colors according to the first forewarning index p1 and/or the second forewarning index p2. In the embodiment, different colors represent different forewarning levels.

Optionally, there may be three forewarning levels. The interactive module 13 presents the three forewarning levels to the user by displaying a light green color, a light yellow color and an orange color, wherein the orange color indicates the highest forewarning level, the light yellow color indicates a second forewarning level, and the light green color indicates the lowest forewarning level. For example, when p1>20% and/or p2>20%, it is shown that m1 is far smaller than M1 and/or m2 is far smaller than M3, at this time, the processing module 12 instructs the interaction module 13 to display the light green color. When 10%<p1≤20% and/or 10%<p2≤20%, it is shown that m1 is closer to M1 and/or m2 is closer to M3, at this time, the processing module 12 instructs the interaction module 13 to display the light yellow color, to remind the user to pay attention. When p1≤10% and/or p2≤10%, it is shown that m1 is very close to M1 and/or m2 is very close to M3, at this time, the processing module 12 instructs the interaction module 13 to display the orange color, to remind the user to pay high attention.

It should be noted that, if the processing module 12 determines that m1 is less than or equal to M2, and/or, m2 is less than or equal to M4, it represents that the current radioactivity parameter is normal and no forewarning and warning are required. At this time, the processing module 12 may also instruct the interaction module 13 to display a preset color, to indicate that the amount of radiation is normal. Further, when the amount of radiation is normal, the processing module 12 may further instruct the interaction module 13 to display the current m1 and/or m2.

The preset warning condition includes: m1 being greater than or equal to M1, and/or m2 being greater than or equal to M3.

Particularly, the processing module 12 instructs the interactive module 13 to display the preset color to indicate that the amount of radiation exceeds standard and display m1 and/or m2, when it is determined that the warning condition is satisfied. Optional, a red color may be displayed to indicate that the amount of radiation exceeds standard.

Further, the communication module 14 is further configured to receive prompt information or suggestion information sent by the mobile terminal through a short range wireless communication mode.

The processing module 12 is further configured to instruct the communication module 14 to send the detection value of the radioactive parameter to the mobile terminal through a short range wireless communication mode, when it is determined that the preset forewarning condition or the preset warning condition is satisfied; and the processing module 12 is further configured to instruct the interactive module 3 to display the prompt information or the suggestion information, when the communication module 12 receives the prompt information or the suggestion information sent by the mobile terminal.

A health management application (APP) may be installed on the mobile terminal. The smart terminal according to the embodiment of the present disclosure may upload the forewarning and/or warning judgment result to the health management APP of the mobile terminal in real time. The health management APP of the mobile terminal may analyze the judgment result and provide health tips and suggestions. The specific implementation of how the Health management APP analyzes the judgment result to obtain the health tips and health suggestions is well known in the art, which will not be repeated herein. It should be noted that, the smart terminal may also send the detected radioactive parameters to the health management APP of the mobile terminal, such that the health management APP of the mobile terminal analyzes the radioactive parameters.

Further, the processing module 12 is further configured to indicate the interactive module 13 to display one or any combination of the following information: user identity information, company information, advertising information, when the interactive module 13 is not issuing any forewarning or warning. That is, the smart terminal may display the identity information, such as the company LOGO, the user name, the photograph, the department, the post or the like at the non-processing time, and the advertisement information may also be displayed, thereby further extending the function of the smart terminal.

Further, the smart terminal may also be provided with an image acquiring module (e.g., a camera) and a sound acquiring module (e.g., a microphone), to transmit the acquired image and sound information to the mobile terminal, thus realizing the instrumented sharing with the mobile terminal.

It should be noted that, since the smart terminal according to the embodiment of the present disclosure may remotely control its paired mobile terminal, all functions possessed by the mobile terminal may be entirely realized through the smart terminal.

Optionally, the interactive module 13 may be a touch screen display. Particularly, it may be a low power high brightness display device, such as an organic light emitting diode (OLED) display screen, a micro light emitting diode (Micro LED) display screen, or a liquid crystal display (LCD).

It should be noted that, in order to further improve the forewarning and warning effects to draw sufficient attention from the user, the interactive module 13 may not only display backlights of different colors according to the judgment results of the forewarning and warning, backlights of the interactive module 13 may also flicker, and a frequency of the flicker may also be increased with the increase of the warning level. For example, when the backlight of the interactive module 13 is in light green, no flicker occurs; when the backlight of the interactive module 13 is in light yellow, the frequency of flicker is relatively low; when the backlight of the interactive module 13 is in orange, the frequency of flicker is relatively high; and when the backlight of the interactive module 13 is in red, the frequency of flicker is the highest.

Further, when the processing module 12 judges that the warning condition is satisfied, the smart terminal may also issue a warning prompt tone.

As shown in FIG. 2, the smart terminal of the embodiment of the present disclosure may be designed in a form of a tie clip, which is convenient for the user to wear. However, those skilled in the art will recognize that, the smart terminal is not limited to the tie clip, and other products provided with the above functional modules and functions, such as brooches, rings, hairpins, etc., are within the protection scope of the present disclosure.

In the embodiment of the present disclosure, a communication module is built in in the smart terminal, and the real-time interconnection with the mobile terminal is achieved through the short range wireless communication mode such as WIFI. The user may remotely operate the mobile terminal in real time through the interactive module of the smart terminal, to answer or make a call or perform other operations. At the same time, the radioactive parameters detected by the radioactive detection module in the smart terminal may also be displayed in the interactive module in real time. When the radioactive parameter reaches to a certain hazard level, the interactive module sends a colorized flicker light and issues a warning prompt tone. The forewarning, warning judgment results, or radioactive parameter detection values may be uploaded to the mobile terminal in real time via the communication module, such that the health management APP of the mobile terminal provides the user with health comments or advice.

The smart terminal provided by the present disclosure utilizes a communication module to perform short range wireless communication with a mobile terminal having a wireless communication function, so as to realize the connection and pairing between the smart terminal and the mobile terminal. A mapping is established between an interactive module of the smart terminal and an interactive module of the mobile terminal, such that the interactive module of the mobile terminal may be remotely operated by operating the interactive module of the smart terminal. In this way, when the smart terminal is in a closed radioactive working environment, on one hand, the radioactive detection and monitoring may be achieved by using the radioactive detection module, on the other hand, the wireless communication function of the mobile terminal may be achieved by remotely controlling the matched mobile terminal. Therefore, the radioactivity detection function and the wireless communication function may be effectively integrated, which achieves the normal use of the wireless communication function of the mobile terminal under the closed radioactive working environment, and improves the convenience of communication under the radioactive working environment.

It is to be understood that, the above implementations are merely illustrative implementations for the purpose of illustrating the principles of the present disclosure, but the present disclosure is not limited thereto. It will be apparent to those skilled in the art that, various changes and modifications may be made therein without departing from the spirit and essence of the present disclosure, which are also considered to be within the protection scope of the present disclosure.

What is claimed is:

1. A smart terminal, comprising a radioactive detector, a communication device, an interactive device and a processor, wherein
   the radioactive detector is configured to detect a radioactive parameter and send a detection value of the radioactive parameter to the processor;
   the interactive device is configured to receive an operation instruction of a user and send the operation instruction to the processor;
   the communication device is configured to establish a connection and pair with a mobile terminal having a wireless communication function through a short range wireless communication mode; and
   the processor is configured to establish a mapping between the interactive device of the smart terminal and an interactive device of the mobile terminal, and remotely control the interactive device of the mobile terminal according to the operation instruction received by the interactive device of the smart terminal.

2. The smart terminal according to claim 1, wherein the processor is further configured to judge whether the detection value of the radioactive parameter received from the radioactive detector satisfies a preset forewarning condition or a preset warning condition,
   when the detection value of the radioactive parameter satisfies the preset forewarning condition, the processor instructs the interactive device of the smart terminal to issue a forewarning; and when the detection value of the radioactive parameter satisfies the preset warning condition, the processor indicates the interactive device of the smart terminal to issue a warning.

3. The smart terminal according to claim 2, wherein the processor is further configured to instruct the communication device to send the detection value of the radioactive parameter to the mobile terminal through the short range wireless communication mode, when it is determined that the detection value of the radioactive parameter satisfies the preset forewarning condition or the preset warning condition.

4. The smart terminal according to claim 2, wherein the communication device is further configured to receive prompt information or suggestion information sent by the mobile terminal through the short range wireless communication mode; and
   the processor is further configured to instruct the interactive device of the smart terminal to display the prompt information or the suggestion information, when the communication device receives the prompt information or the suggestion information sent by the mobile terminal.

5. The smart terminal according to claim 2, wherein the radioactive detector periodically acquires the radioactive parameters according to a preset sampling period.

6. The smart terminal according to claim 5, wherein the processor periodically judges whether the detection value of the radioactive parameter satisfies the preset forewarning condition or the preset warning condition according to a preset processing period, the preset processing period being greater than the preset sampling period.

7. The smart terminal according to claim 6, further comprising a memory configured to store respective detection values of the radioactive parameters within each processing period, wherein the processor is configured to compare the detection value m1 of the radioactive parameter detected by the radioactive detector at a latest time with a preset first threshold value M1 and a preset second threshold value M2, respectively, and obtain respective detection values of the radioactive parameters within a previous processing period from the memory, calculate a sum m2 of respective detection values of the radioactive parameters within the previous processing period, and compare m2 with a preset third threshold M3 and a preset fourth threshold M4, respectively; the preset forewarning condition comprises at least one of: m1 being less than M1 and greater than M2, or, m2 being less than M3 and greater than M4, where M1>M2, M3>M4, M4>M1; and the preset warning condition comprises at least one of: m1 being greater than or equal to M1, or m2 being greater than or equal to M3.

8. The smart terminal according to claim 7, wherein the processor is further configured to calculate at least one of a first forewarning index p1 or a second forewarning index p2 according to the following formula: p1=(M1−m1)/M1 and p2=(M3−m2)/M3, when it is determined that the detection value of the radioactive parameter satisfies the preset forewarning condition; and instruct the interactive device of the smart terminal to issue a forewarning by displaying different colors according to at least one of the first forewarning index p1 or the second forewarning index p2, the different colors representing different forewarning levels.

9. The smart terminal according to claim 7, wherein the processor is configured to indicate the interactive device of the smart terminal to display a preset color to represent that a radiation quantity exceeds standard, and display at least one of m1 or m2, when it is determined that the detection value of the radioactive parameter satisfies the preset warning condition.

10. The smart terminal according to claim 2, wherein the smart terminal issues a warning prompt tone, when the processor determines that the detection value of the radioactive parameter satisfies the preset warning condition.

11. The smart terminal according to claim 1, wherein the processor is further configured to indicate the interactive device of the smart terminal to display one or any combination of the following information: user identity information, company information, and advertising information, when the interactive device of the smart terminal is not issuing any forewarning or warning.

12. The smart terminal according to claim 1, wherein the short range wireless communication mode comprises: infrared, Bluetooth, wireless fidelity (WIFI), Ultra Wideband (UWB) or Zigbee.

13. The smart terminal according to claim 1, wherein the interactive device of the smart terminal is a touch screen display.

14. The smart terminal according to claim 13, wherein the interactive device of the smart terminal is: an organic light emitting diode (OLED) display screen, a micro light emitting diode (Micro LED) display screen or a liquid crystal display (LCD).

15. The smart terminal according to claim 14, wherein the smart terminal is a tie clip, a brooch, a ring or a hairpin.

* * * * *